(12) United States Patent
Le et al.

(10) Patent No.: US 12,409,583 B2
(45) Date of Patent: Sep. 9, 2025

(54) SPRAYED MULTILAYER POLYUREA AND POLYURETHANE COMPOSITES

(71) Applicant: American Polymers Corporation, Santa Fe Springs, CA (US)

(72) Inventors: Dustin Le, Santa Fe Springs, CA (US); John H. Bender, Santa Fe Springs, CA (US)

(73) Assignee: AMERICAN POLYMERS CORPORATION, Santa Fe Springs, CA (US)

( * ) Notice: Subject to any disclaimer, the term of this patent is extended or adjusted under 35 U.S.C. 154(b) by 144 days.

(21) Appl. No.: 18/514,861

(22) Filed: Nov. 20, 2023

(65) Prior Publication Data

US 2025/0162207 A1    May 22, 2025

(51) Int. Cl.
| | | |
|---|---|---|
| *B29C 41/22* | (2006.01) | |
| *B29C 41/08* | (2006.01) | |
| *B29C 44/02* | (2006.01) | |
| *B29C 44/08* | (2006.01) | |
| *B29K 75/00* | (2006.01) | |
| *B29K 105/04* | (2006.01) | |
| *C09D 5/02* | (2006.01) | |
| *C09D 175/02* | (2006.01) | |
| *C09D 175/04* | (2006.01) | |

(52) U.S. Cl.
CPC .............. *B29C 41/22* (2013.01); *B29C 41/08* (2013.01); *B29C 44/022* (2013.01); *B29C 44/08* (2013.01); *C09D 5/021* (2013.01); *C09D 175/02* (2013.01); *C09D 175/04* (2013.01); *B29K 2075/00* (2013.01); *B29K 2105/04* (2013.01)

(58) Field of Classification Search
CPC ....... B29C 41/22; B29C 41/08; B29C 44/022; B29C 44/08; B29C 44/367; B29C 44/50; B29C 70/305; B29C 2033/3864; C09D 175/02; C09D 175/04
See application file for complete search history.

*Primary Examiner* — Stella K Yi
(74) *Attorney, Agent, or Firm* — STETINA GARRED BRUCKER & NEWBOLES

(57) ABSTRACT

Polyurea/polyurethane composites and methods for making the same are disclosed. Four primary layers, an aliphatic polyurea layer, a first elastomeric layer, a structural foam layer, and second elastomeric layer, can be applied to a mold sequentially. By using plural component spray systems to spray isocyanate components and resin components corresponding to each layer at specifications, such as the temperatures and pressures of the material components, structurally sound molded composites can be formed. The spray system for the aliphatic polyurea layer can use a liquid or mechanical purge type spray gun, while the spray systems for the first elastomeric layer, the structural layer, and a second elastomeric layer can use air, mechanical or solvent purge type spray guns. Optional layers may be applied in between the primary layers, such as polyurea/polyurethane layers after the aliphatic polyurea layer or one or more additional structural foam layers after the primary structural foam layer.

17 Claims, No Drawings

SPRAYED MULTILAYER POLYUREA AND POLYURETHANE COMPOSITES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of Invention

The present invention relates to the production of polyurea and polyurethane composite products. More specifically, the present application relates to methodologies of sequentially applying polyurea and polyurethane layers to a mold to produce a composite product.

2. Related Art

Polyurethane and polyurea coatings have been widely used as protective coatings for vehicles, flooring, and more. These coatings may be formed as the reaction product of an isocyanate component with a resin component, such as a amine or a polyol. By applying both material components to a substrate, which can be achieved with a plural component spray system, the reaction may occur and after the resulting substance has cured, the coating may be formed. The lack of volatile organic compounds (VOCs), high flexibility, fast cure rate, and high hardness characteristic of these coatings have made them ideal as protective coverings in these applications.

In recent years, attempts have been made to manufacture products that are primarily made of polyurethane and polyurea coatings. By applying multiple coatings onto a substrate and allowing those layers to cure, a polyurethane/polyurea composite product can be formed. One field in particular in which it has been desirable to make these types of products is the field of water-holding vessels like sinks and pools. Given that the process of applying the layers can be carried out with ease and quickness relative to alternative, conventional production processes, it is contemplated that such a manufacturing method could considerably save on costs and time. However, it has been challenging to say the least to make composite products which are structurally sound. More often than not, the composite produced tends to be brittle, prone to fracturing, etc. Thus far, it has been found that only with careful, methodical precision can ideal, practically useable composites be produced, which can sacrifice the very benefits this manufacturing methodology is meant to achieve. It can therefore be seen that it is desirable to develop improved composites and methods for making the same which can be carried out quickly and efficiently while still producing structurally sound and durable polyurea/polyurethane composites.

BRIEF SUMMARY

To solve these and other problems, polyurethane/polyurea composites and methods for making the same are disclosed which can lead to the production of high quality, strong conditioned composites. Such a method may include the application of four primary layers onto a mold, namely an aliphatic polyurea layer, a first elastomeric layer, a structural foam layer, and a second elastomeric layer. Each primary layer may be applied sequentially in that listed order via spraying an isocyanate component and a resin component corresponding to those layers with use of plural component spray systems. Certain sets of parameters and specifications for the spray systems corresponding to each layer have been found to produce molded composite products of pristine caliber. The spray systems may comprise a spray gun, and it has been found that by using a liquid or mechanical purge type spray gun for the application of the aliphatic polyurea layer and an air, mechanical, or solvent purge type spray gun for the application of the first elastomeric layer, the structural foam layer, and the second elastomeric layer, preferred composite products may be formed.

The aliphatic polyurea layer can be applied such that it has a thickness ranging from 3 mils to 1 inch, and this thickness may vary throughout different portions of the layer. The temperature of the isocyanate component and the resin components when sprayed during the application of this layer may both range from 100° F. to 175° F., preferably at least 165° F. and at least 155° F. for the isocyanate and resin components respectively. Both components can be heated via heating elements in the spray system, such as within hoses that connect reservoirs holding the material components with the spray gun, and this configuration can be used for each spray system. The isocyanate and resin components can both be sprayed at a material pressure in a range of 1300 psi to 3000 psi, preferably up to 2600 psi and up to 2400 psi for the isocyanate and resin components respectively. This aliphatic polyurea layer can have an open time ranging from 5 seconds to 24 hours, within which one or more additional, optional polyurea/polyurethane layers and/or the first elastomeric layer can be applied.

For the first elastomeric layer, the temperature of the isocyanate component and the resin components when sprayed may both range from 100° F. to 175° F. but may preferably be at least 135° F. and at least 170° F. for the isocyanate and resin components respectively, and both components can be sprayed at a material pressure range of 1300 psi to 3000 psi, preferably up to 2600 psi. This first elastomeric layer applied may have a hardness ranging from 35 shore D to 90 shore D, a tensile property ranging from 2,000 psi to 7,000 psi, and a flexural modulus property from 20,000 psi to 650,000 psi. Within the gel time of this first elastomer layer, which can range from 3 seconds to 3 minutes, chopped fiberglass can be applied to the mold to add reinforcement to the composite product.

Following the first elastomeric layer, a structural foam layer can be applied such that it has a density ranging from 2 lbs/ft$^3$ to 70 lbs/ft$^3$ and a thickness from 10 mils to 5 inches. The isocyanate component and the resin components corresponding to this layer may both be at temperatures from 100° F. to 175° F., preferably at least 105° F., when sprayed, and both may be further sprayed at a material pressure ranging from 1300 psi to 3000 psi, preferably up to 2,000 psi. Within the open time of this layer, which can range from 1 minute to 24 hours, one or more additional, optional structural foam layers can be applied to further modify the molded composite product formed. After any and all structural foam layers have been applied, a second elastomeric layer can be applied.

The second elastomeric layer can be the final layer applied, and it could be substantially the same or different than the first elastomeric layer. As such it can have similar properties, such as hardness ranging from 30 shore D to 90 shore D, tensile property ranging from 2,000 psi to 7,000 psi, and flexural modulus property from 20,000 psi to 650,000 psi. The isocyanate component and the resin component corresponding to this layer may both be sprayed at a material pressure range of 1300 psi to 3000 psi, preferably up to 2600 psi, and their temperature may both range from 100° F. to 175° F., while preferably being at least 135° F. and at least 155° F. for the isocyanate and resin respectively. Once the final layer has been applied and the layers are allowed to cure, the molded composite product can be removed from the mold.

The spray systems used for the application of each layer may comprise one or more filters, which may include a pre-filter downstream of a main filter. The filters may be incorporated into the hoses which the material components flow through before being sprayed from the spray gun. These hoses may comprise a y-strainer wherein the pre-filter may be positioned. The pre-filter may be at least a 20-mesh filter, while the main filter may be at least a 40-mesh filter.

All of these embodiments are contemplated to be within the scope of the invention herein disclosed. These and other embodiments will become readily apparent to those skilled in the art form the following detailed description of the preferred embodiments the invention not being limited to any particular preferred embodiments disclosed.

DETAILED DESCRIPTION

Disclosed herein are polyurethane molded composites and methods for making the same. A polyurethane molded composite may be manufactured by applying multiple layers on a mold. The layers to be applied to a mold may include at least 4 primary layers: an aliphatic polyurea layer, a first elastomeric layer, a foam layer, and a second elastomeric layer. Each of these layers may be applied with use of a spray system, and different spray systems can be used for the application of each layer. Plural component spray systems, in which at least two material components, usually designed as an A side and a B side, can be sprayed simultaneously, may ideally be used for each primary layer's application. Each primary layer may be applied via spraying an isocyanate material component and a resin material component that can be chosen such that when sprayed sequentially on the mold, the reaction product of those material components can form the layer. Additional layers may optionally be applied before or after certain layers to change properties of the molded composite. When the layers have cured, the molded composite product may be formed and thereafter removed from the mold.

Molds may be manufactured and shaped such that the applied layers, when cured, may be formed in the shape of the desired molded composite product. Thus, conventional molds known and used in the art may be utilized, including molds developed in the future that could be suitable for use with this disclosure.

Spray systems that can be used to apply these layers may comprise reservoirs, which can individually hold the material components corresponding to a layer (such as an isocyanate material component reservoir and a resin material component reservoir), a spray gun, and hoses which can fluidly connect the reservoirs to the spray gun. An operator may aim the spray gun and pull its trigger or otherwise actuate the spray gun, which can result in both/all material components being emitted at the same time to facilitate simultaneous application of those material components on the mold/the previously applied layer. Once applied, the material components may react with each other to form their respective layer. Spray guns can be categorized according to their spraying methodology, which includes air purge, liquid purge, and mechanical purge spray guns.

The reservoirs, spray gun, and hoses connecting the two may be configured in numerous ways, which may be taken advantage of to produce surprisingly structurally-sound molded composites that can be quickly manufactured. Hoses may be associated with each material component, such that the material components can be independently transported from the reservoir to the spray gun. These hoses may include one or more filters, including prefilters downstream of a main filter. Any of the hoses may comprise a y-strainer which may itself comprise one or more of the filters. For each spray system used for application of the primary layers, a preferred embodiment includes prefilter in a y-strainer that is at least 20 mesh and a main filter that is at least 40 mesh. A spray system may also comprise temperature adjusting elements to heat or cool the material components as they flow through different portions of the spray system. For instance, heating elements may act upon the reservoir and/or the hoses to heat material components with the spray system. If incorporated into the hose, it can be seen that the temperature adjusting elements may heat/cool the material components as they flow during the spraying process, which may ideally allow the temperature of the reservoirs sit closer to reasonable/ambient levels. Spray systems can also be configured to adjust the material flow and output from the spray gun, which may affect the pressure of the material components when spraying. By fine-tuning the configuration of spray systems, it has been found that structurally robust molded composites can be efficiently and effectively formed. Such molded composites may then be used in a variety of applications, including, but not limited to, sinks or bathtubs.

While specific spray systems and the specifications associated therewith used in working embodiment will be described in this disclosure, it is to be understood, however, that the same or equivalent functions may be accomplished by different embodiments and equipment that are also intended to be encompassed within the scope of the present disclosure. It is further understood that the use of relational terms such as first and second and the like are used solely to distinguish one from another entity without necessarily requiring or implying any actual such relationship or order between such entities.

Depending on the specific material components used and the resulting layer applied to the mold, curing properties for the layers, such as open time and gel time, may vary, as would be understood by those skilled in the art. Certain layers may need to be added within these time periods so that the layers can collectively form a chemically bonded composite.

The first layer, which can be applied to the mold using a plural component spray system with a mechanical or liquid purge spray gun, can be an aliphatic polyurea layer, in that the isocyanate component and resin component used in the spray system can be chosen such that they react to form the aliphatic polyurea. This first layer may be applied onto the mold such that the layer has a thickness ranging from 3 mils to 1 inch, and this thickness can either be constant or varied throughout the layer.

Ideally, the reaction product can flow and spread on the mold surface without dripping, sagging, and/or creating craters or fisheye so that a smooth, continuous layer can be formed on the surface of the mold. This result was found to be achievable with the following spray system configuration. A Graco® Rector 2 H-XP3™ was used with a Graco® Fusion MP™ spray gun. Part specifications used in this spray system include an XF1818 Flat mix chamber part, an FTM638 spray flat tip, and a GC0279 spray slat tip gasket. Prior to being sprayed out of the spray gun, both components can be heated to a temperature range from 100° F. to 175° F., but preferably the isocyanate component can be heated to at least a temperature of 165° F. and the resin component can be heated to at least a temperature of 155° F.; the material components were present in their respective reservoirs at an ambient temperature around 80° F., and by setting the hose temperature set point to 165° F., both components were able to reach those preferred temperatures. Both components can be sprayed at a material pressure ranging from 1300 psi to 3000 psi, but the isocyanate component can ideally be sprayed at a material pressure of up to 2400 psi, while the resin component can be sprayed ideally at a material pressure of up to 2600 psi.

This layer may cure quickly, in that the gel time may range from just 3 seconds to 5 minutes, but it may have a longer the open time in a range of 5 seconds to 24 hours in which the next layer can be applied. Before applying the first elastomeric layer, one or more optional layers can be applied, which may include another aliphatic polyurea layer and/or other types of polyurea/polyurethane layer(s).

The next primary layer which can be applied over the aliphatic polyurea layer/the last additional layer applied may be a first elastomeric layer. The isocyanate and resin components of this layer may be applied with a spray system using an air, mechanical, or solvent purge spray gun. The isocyanate component of this layer may include di, tri, and/or polyfunctional isocyanates which, when reacting with the resin component, may form a multi-crosslinking polymer including di, tri, tetra, penta, hexa, hepta, and/or octa functionality reactive polymers which can form this high-elasticity layer.

Ideal molded composites have been found to be producible with the following spray system configuration. A Graco® Rector 2 H-XP3™ was used with a Graco® Fusion AP™ spray gun was used. An AF2929 Flat mix chamber part, an FTO624 spray flat tip, and a 246360 spray flat tip gasket part specifications were employed. Prior to being sprayed out of the spray gun, both material components can be heated to a temperature range from 100° F. to 175° F., although the isocyanate component can ideally be heated to at least a temperature of 135° F. and the resin component can ideally be heated to at least a temperature of 170° F. Similar to the previous example, by setting the hose temperature set point to 170° F., these ideal temperatures could be achieved for both components when starting in the reservoirs at ambient temperatures ~80° F. When spraying, both components can be sprayed at material pressures ranging from 1300 psi to 3000 psi, but in preferred embodiments the isocyanate component can be sprayed at a material pressure of up to 2600 psi, while the resin component can be sprayed at a material pressure of up to 2600 psi.

During the gel time for this first elastomeric layer, which has been found to range from 3 seconds to 3 minutes, chopped fiberglass can optionally be applied over this first elastomeric layer. Adding this chopped fiberglass can add reinforcement to and increase the strength of the final molded product. When cured, this first elastomeric layer may have beneficial properties, including a hardness of 35 Shore D to 90 Shore D, a tensile property of 2,000 psi to 7,000 psi, and a flexural modulus from 20,000 to 650,000 psi. This first elastomeric layer could also have a self-fire extinguishing property, such that when the layer is exposed to a direct flame, the fire may self-extinguish. Testing has shown that after being exposed to the flame of a hand handle torch from 5 seconds to 1 minute, this first elastomeric layer self-extinguished the flame from 5 seconds to 2 minutes.

The next primary layer, which can be applied to the mold over the previous elastomeric layer, may be a structural foam layer, which could be applicable via a spray system with an air, mechanical, or solvent purge spray gun. The isocyanate component can include di and/or tri functional poly-isocyanates which when reacted with the resin component can form a foam layer which can have di, tri, and/or tetra polyethers, as well as di and/or tri polyester functionality polyols. Additives, including amines and metal-based catalysts can be incorporated into the structural foam as well, which may be applied before, after, or alongside the isocyanate and resin components, to change the variables of the structural foam layer, including the cream time, gel time rise time, foam expansion rate, and tack free time.

The ideal molded composites have been experimentally found to be produced with the following spray system configuration for the structural foam layer. A Graco® Rector 3 E-30™ was used with a Graco® Fusion AP™ spray gun. The parts implemented include an AF2929 mix chamber and an FTO0838 pattern control fan disk. Prior to being sprayed out of the spray gun the isocyanate and resin material components can be heated to a temperature range of 100° F. to 175° F., but preferably the isocyanate material component can be heated to at least a temperature of 105 OF and the resin material component can be heated to at least a temperature of 105° F. By setting the hose temperature set point to 105° F., the reservoirs can be kept at ambient temperatures around 80° F. while still accomplishing the spraying of those material components at the preferred temperature ranges. Both material components can be sprayed at a material pressure from 1300 psi to 3000 psi, and ideally the isocyanate and resin components can be sprayed at a material pressure of up to 2000 psi. The exothermicity of the application of the structural foam layer was found to not be an issue, as it was found that the temperature ranged from manageable levels of 150° F. to 350° F. within 5-20 minutes after application of the structural foam layer, and this temperature quickly dissipates in less than 30 minutes after application.

The structural foam layer can have a density ranging from 2 lbs/ft$^3$ to 70 lbs/ft$^3$ (pounds per cubic foot) and/or a thickness ranging from 10 mils to 5 inches (and this thickness may be varied throughout the layer). One or more additional structural foam layers can be applied after the primary structural foam layer, and each of these additional layers can be substantially the same as or different than the primary structural foam layer.

The next primary layer, which can be applied to the last structural layer applied, can be a second elastomeric layer. This second elastomeric layer may be applied over the structural foam layer within the tack free time of the latter, which can range from 1 minute to 24 hours. The isocyanate and resin components may be applied with a spray system using an air, mechanical, or solvent purge spray gun to form the second elastomeric layer. The material components and the resulting layer can be substantially the same or different as the first elastomeric layer. As such, the second elastomeric layer may have similar properties discussed earlier, including the hardness of 30 Shore D to 90 Shore D, the tensile property of 2,000 psi to 7,000 psi, the flexural modulus from 20,000 psi to 650,000 psi, and/or the self-fire extinguishing property.

Experiments have shown that the following spray system configuration has led to the production of ideal molded composites. A Graco® Rector 3 E-XP2™ was used with a Graco® P2™ spray gun. This system utilized the following parts: a GC2500 mix chamber part, a GC 1926 field spray adapter, and a GC0279 spray flat tip gasket. Prior to being sprayed out of the spray gun, both material components can be heated to a temperature range of 100° F. to 175° F.; in ideal embodiments, the isocyanate component can be heated to at least a temperature of 135° F. and the resin component can be heated to at least a temperature of 155° F. This ideal result was found to be accomplished by setting the hose temperature set point to 155° F., which can allow the material components to be at ambient temperatures around 80° F. within the reservoirs prior to spraying. When spraying, both material components can be sprayed at a material pressure in the range of 1300 psi to 3000 psi, although preferably the isocyanate component can be sprayed at a material pressure of up to 2600 psi, while the resin component can be sprayed at a material pressure of up to 2600 psi.

After the last layer applied cures, the molded composite product can be formed, such that each applied layer has chemically bonded such that they form one whole composite structure. The molded composite may then be removed from the mold and used however seen fit. Molds can be reused to make more molded composites such that after washing/cleaning steps are performed on the mold, the first aliphatic polyurea layer can be applied to the mold again to start the process of making another molded composite.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method of producing a molded composite product, the method comprising the steps of:
   a) applying an aliphatic polyurea layer to a mold by spraying a first isocyanate material component and a first resin material component with a first spray system, the first spray system comprising a mechanical purge or liquid purge spray gun, the temperature of the first isocyanate component ranging from 100° F. to 175° F. when being sprayed, the temperature of the first resin component ranging from 100° F. to 175° F. when being sprayed;
   b) applying a first elastomeric layer to the aliphatic polyurea layer by spraying a second isocyanate material component and a second resin material component with a second spray system, the second spray system comprising a secondary air purge spray gun, a secondary mechanical purge spray gun, or a secondary solvent purge spray gun the temperature of the second isocyanate component ranging from 100° F. to 175° F. when being sprayed, the temperature of the second resin component ranging from 100° F. to 175° F. when being sprayed;
   c) applying a structural foam layer to the first elastomeric layer by spraying a third isocyanate material component and a third resin material component with a third spray system, the third spray system comprising a tertiary air purge spray gun, a tertiary mechanical purge spray gun, or a tertiary solvent purge spray gun, the temperature of the third isocyanate component ranging from 100° F. to 175° F. when being sprayed, the temperature of the third resin component ranging from 100° F. to 175° F. when being sprayed;
   d) applying a second elastomeric layer to the structural foam layer by spraying a fourth isocyanate material component and a fourth resin material component with a fourth spray system, the fourth spray system comprising a quaternary air purge spray gun, a quaternary mechanical purge spray gun, or a quaternary solvent purge spray gun, the temperature of the fourth isocyanate component ranging from 100° F. to 175° F. when being sprayed, the temperature of the fourth resin component ranging from 100° F. to 175° F. when being sprayed;
   e) allowing the layers to cure to form the molded composite product; and
   f) removing the molded composite product from the mold.

2. The method of claim 1, wherein the aliphatic polyurea layer has a thickness ranging from 3 mils to 1 inch.

3. The method of claim 1, wherein the first elastomeric layer has a hardness ranging from 35 shore D to 90 shore D, a tensile property ranging from 2,000 psi to 7,000 psi, and a flexural modulus property from 20,000 psi to 650,000 psi.

4. The method of claim 1, wherein the second elastomeric layer has a hardness ranging from 30 shore D to 90 shore D, a tensile property ranging from 2,000 psi to 7,000 psi, and a flexural modulus property from 20,000 psi to 650,000 psi.

5. The method of claim 1, wherein the first elastomeric layer has a gel time ranging from 3 seconds to 3 minutes; and wherein the method further comprises a step of:
   applying chopped fiberglass to the first elastomeric layer within the gel time.

6. The method of claim 1, wherein the structural foam layer has a density ranging from 2 lbs/ft$^3$ to 70 lbs/ft$^3$.

7. The method of claim 1, wherein the method further comprises a step of:
   applying a polyurea or polyurethane layer to the aliphatic polyurea layer.

8. The method of claim 1, wherein the method further comprises a step of:
   applying one or more additional structural foam layers to the structural foam layer.

9. The method of claim 1, wherein the material pressure of the first isocyanate component when being sprayed is up to 3000 psi; and wherein the material pressure of the first resin component when being sprayed is up to 3000 psi.

10. The method of claim 1, wherein the material pressure of the second isocyanate component when being sprayed is up to 3000 psi; and wherein the material pressure of the second resin component when being sprayed is up to 3000 psi.

11. The method of claim 1, wherein the material pressure of the third isocyanate component when being sprayed is up to 3000 psi; and wherein the material pressure of the third resin component when being sprayed is up to 3000 psi.

12. The method of claim 1, wherein the material pressure of the fourth isocyanate component when being sprayed is up to 3000 psi; and wherein the material pressure of the fourth resin component when being sprayed is up to 3000 psi.

13. The method of claim 1, wherein the first spray system, the second spray system, the third spray system, and the fourth spray system each individually comprise a first hose connecting the respective spray gun to an isocyanate reservoir containing the respective isocyanate component and a second hose connecting the respective spray gun to a resin reservoir containing the respective resin component, each of the first hoses and the second hoses comprising a main filter;

wherein each of the main filters are at least a 40-mesh filter.

14. The method of claim 13, wherein each of the first hoses and the second hoses further comprise a y-strainer, each of the y-strainers comprising a prefilter;

wherein each of the prefilters are at least a 20-mesh filter.

15. The method of claim 1, wherein the aliphatic polyurea layer has an open time ranging from 5 seconds to 24 hours; wherein the structural foam layer has an open time ranging from 1 minute to 24 hours; wherein the first elastomeric layer is applied within the open time of the aliphatic polyurea layer; and wherein the second elastomeric layer is applied within the open time of the structural foam layer.

16. The method of claim 1, wherein the structural foam layer has a thickness ranging from 10 mils to 5 inches.

17. The composite product produced by the method of claim 1.

* * * * *